US 8,662,518 B2

(12) United States Patent
Koike

(10) Patent No.: US 8,662,518 B2
(45) Date of Patent: Mar. 4, 2014

(54) VEHICLE WITH ROTATABLE FUEL TANK

(75) Inventor: Munetaka Koike, Shizuoka-Ken (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 586 days.

(21) Appl. No.: 12/457,879

(22) Filed: Jun. 24, 2009

(65) Prior Publication Data

US 2009/0322069 A1 Dec. 31, 2009

(30) Foreign Application Priority Data

Jun. 30, 2008 (JP) ................................. 2008-171211

(51) Int. Cl.
*B62J 9/00* (2006.01)
*B60P 3/22* (2006.01)

(52) U.S. Cl.
USPC ........................................ 280/288.4; 280/835

(58) Field of Classification Search
USPC ............ 280/219, 288.4, 833, 835; 297/188.1, 297/195.1
See application file for complete search history.

(56) References Cited

U.S. PATENT DOCUMENTS

| 2,932,272 | A | * | 4/1960 | Beas | 114/202 |
| 2,932,277 | A | * | 4/1960 | Borah | 118/270 |
| 3,714,937 | A | * | 2/1973 | Linstead | 126/25 R |
| 4,509,613 | A | * | 4/1985 | Yamaguchi | 180/219 |
| 4,596,301 | A | * | 6/1986 | Nagashima | 180/215 |
| 5,050,270 | A | * | 9/1991 | Burgei et al. | 16/298 |
| 5,107,949 | A | * | 4/1992 | Gotoh et al. | 180/219 |
| 7,040,294 | B2 | * | 5/2006 | Yagisawa et al. | 123/468 |
| 7,416,220 | B2 | * | 8/2008 | Nakazawa et al. | 280/835 |
| 7,690,689 | B2 | * | 4/2010 | Muroo et al. | 280/833 |
| 7,766,119 | B2 | * | 8/2010 | Yokoi et al. | 180/311 |
| 8,061,468 | B2 | * | 11/2011 | Miyashiro et al. | 180/296 |
| 2007/0132225 | A1 | * | 6/2007 | Satake et al. | 280/833 |
| 2008/0011534 | A1 | * | 1/2008 | Miyashiro | 180/219 |
| 2008/0121453 | A1 | * | 5/2008 | Koike | 180/219 |

FOREIGN PATENT DOCUMENTS

| EP | 1862383 A1 | * | 12/2007 |
| JP | 7-172368 | | 7/1995 |
| JP | 8-142959 | | 6/1996 |
| JP | 9-58551 | | 3/1997 |
| JP | 10299588 A | * | 11/1998 |
| JP | 2004249867 A | * | 9/2004 |
| JP | 2007-30688 | | 2/2007 |
| JP | 2007269289 A | * | 10/2007 |
| JP | 2007-321648 | | 12/2007 |
| KR | 2003028632 A | * | 4/2003 |
| KR | 2004005206 A | * | 1/2004 |

* cited by examiner

*Primary Examiner* — Paul N Dickson
*Assistant Examiner* — Daniel Yeagley
(74) *Attorney, Agent, or Firm* — Rabin & Berdo, P.C.

(57) ABSTRACT

A vehicle, such as a motorcycle, can facilitate maintenance of an air cleaner without complicating a peripheral structure of a fuel tank. The vehicle can include a body frame, a rear arm attached to the body frame to support a rear wheel, a rear cushioning member provided between the body frame and the rear arm, and an engine fixed to the body frame. The vehicle can further include a fuel tank supported rotatably at a supporter arranged closer to a rear side of the vehicle than a substantially central position of an axis of the rear cushioning member.

18 Claims, 9 Drawing Sheets

VEHICLE WITH ROTATABLE FUEL TANK

CROSS-REFERENCE TO RELATED APPLICATIONS

This application claims priority under 35 U.S.C. §119 from Japanese Patent Application No. 2008-171211, filed Jun. 30, 2008, the entirety of which is incorporated herein by reference

BACKGROUND OF THE INVENTION

1. Field of the Invention

Embodiments of the present invention relate to a vehicle, such as a motorcycle. More specifically, the embodiments relate to a vehicle that includes an air cleaner under a fuel tank.

2. Technical Background

Some types of motorcycles have an air cleaner under a fuel tank. The air cleaner gathers dirt and dust as the motorcycle travels, and the air cleaner must be maintained on a regular basis. A motorcycle used for motocross races, in particular, gathers a great deal of dust into the air cleaner even for only a single occasion of its operation, because the motorcycle is typically operated on bad roads. Therefore, the motorcycle needs frequent maintenance.

For maintenance of the air cleaner, the fuel tank positioned above the air cleaner must be removed. The fuel tank is connected with a fuel hose used to supply fuel to a fuel injector. It is desirable that the air cleaner can be maintained without removing the fuel hose, so that maintenance is less complicated. In fuel-injection-type motorcycles, because fuel in a fuel hose is under pressure, the removal of the fuel hose from the fuel tank should be avoided as much as possible.

Some conventional motorcycles allow their fuel tanks to be rotated in the vertical direction so that the air cleaner can be maintained while the fuel hose is still connected. JP 2007-321648 A disclosed a motorcycle having a fuel tank that can be rotated upward so that the air cleaner can be readily maintained.

SUMMARY OF THE INVENTION

Embodiments of the present invention provide a vehicle, such as a motorcycle, that can facilitate maintenance of an air cleaner and its surrounding region without complicating a peripheral structure of a fuel tank.

A motorcycle according to the embodiments can include a body frame, a rear arm, a rear cushioning member, an engine, a fuel tank, and an air cleaner. The rear arm can be attached to the body frame to support a rear wheel. The rear cushioning member can be provided between the body frame and the rear arm. The engine can be fixed to the body frame closer to a front side of the motorcycle than the rear cushioning member, and can be supplied with air via an intake path in front of the engine. The fuel tank can be supported rotatably at a supporter arranged closer to a rear side of the motorcycle than a substantially central position of an axis of the rear cushioning member, and can be provided above the engine. The air cleaner can be connected to the engine through the intake path and be at least partly covered by the fuel tank.

Embodiments of the invention further relate to a vehicle with a rotatable fuel tank. The vehicle can comprise a rotation structure for rotation of the fuel tank, and a cushioning member of a rear wheel suspension of the vehicle. The rotation structure can be located farther toward a rear of the vehicle than a substantially central portion of the cushioning member. Additionally or alternatively, the support structure can be substantially aligned, with respect to a longitudinal direction, with a bottom portion of the cushioning member. The vehicle can be a motorcycle, for example.

According to the above-described embodiments of the invention, because the air cleaner can be provided away from a center of rotation of the fuel tank, a large space can be secured above the air cleaner without substantially increasing an angle of rotation of the fuel tank as compared with conventional arrangements, which can facilitate maintenance.

Furthermore, because a large space can be secured above the engine without substantially increasing the angle of rotation of the fuel tank, the removal of a cylinder head cover, and maintenance of valves, plugs and the like can be carried out without removing the fuel tank.

Other features, elements, steps, characteristics and advantages of the present invention will become more apparent from the following detailed description of embodiments of the invention with reference to the attached drawings.

DETAILED DESCRIPTION OF THE INVENTION

The invention will now be described in more detail by way of example with reference to the embodiments shown in the accompanying Figures. It should be kept in mind that the following described embodiments are only presented by way of example and should not be construed as limiting the inventive concept to any particular physical configuration. It should further be understood that "exemplary" as used herein means "serving as an example, instance or illustration." Any aspect referred to herein as "exemplary" is not necessarily to be construed as preferred over other aspects.

Further, if used and unless otherwise stated, the terms "upper," "lower," "front," "back," "over," "under," and similar such terms are not to be construed as limiting the invention to a particular orientation. Instead, these terms are used only on a relative basis.

Moreover, any term of degree used herein, such as "substantially," "essentially," "nearly" and "approximately" means a reasonable amount of deviation of the modified word is contemplated such that the end result is not significantly changed. For example, such terms can be construed as allowing a deviation of at least 5% of the modified word if this deviation would not negate the meaning of the word the term of degree modifies.

General Structure of Motorcycle

Figure 1:
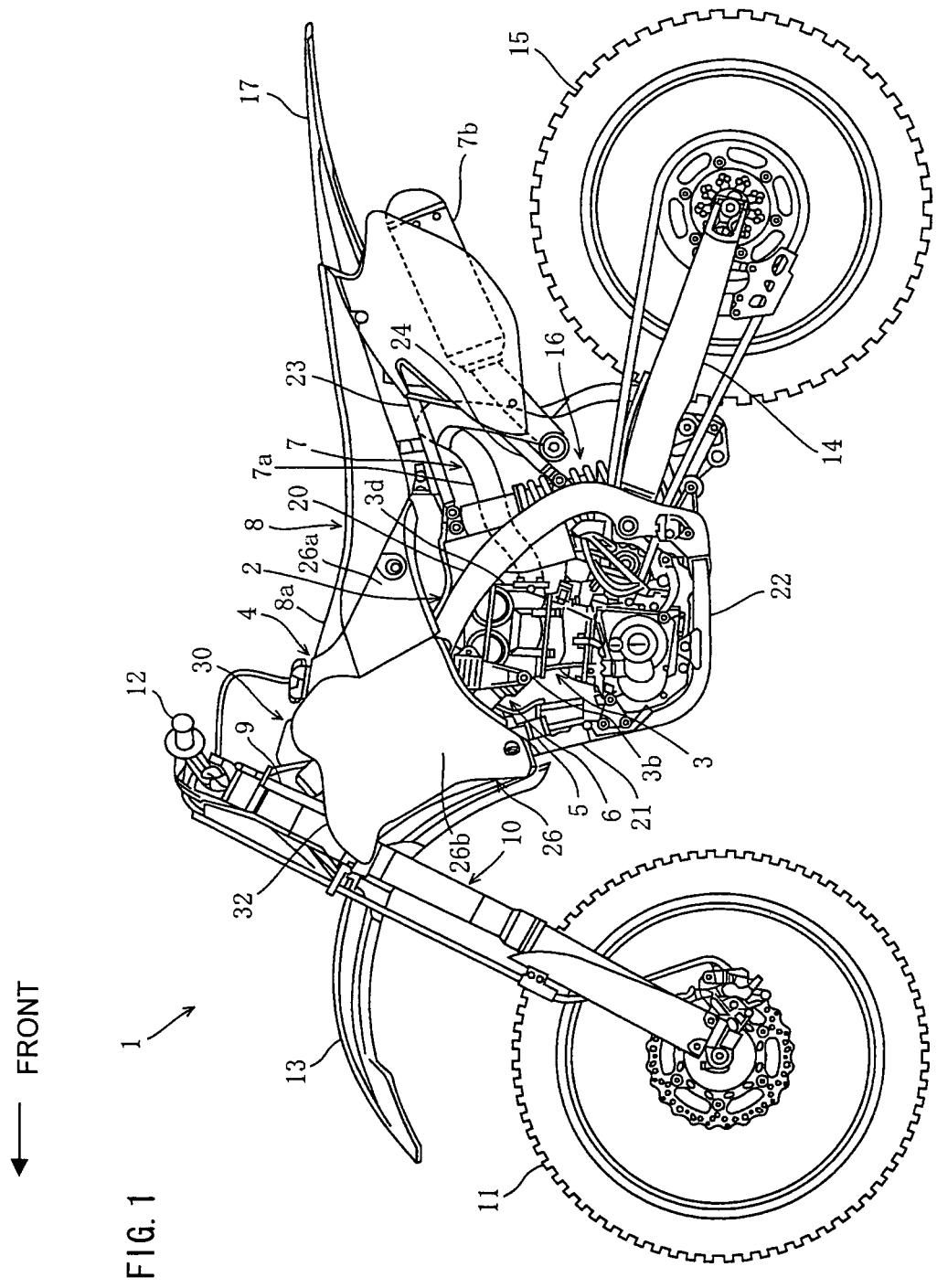
FIG. 1 is a left side view of a motorcycle according to embodiments of the present invention.

The following describes an exemplary embodiment of the present invention with reference to the accompanying drawings. FIG. 1 is a left side view of a motorcycle 1 according to the exemplary embodiment. The motorcycle 1 can be, for example, an off-road type motorcycle, a so-called "motocrosser" for off-road races such as motocross races.

The following description includes references to directions, such as "front," "back," "rear" (same as "back"), "front-to-back," "right," "left," "upward," "downward," "widthwise," "longitudinal" and "vertical." As used herein, these references should be understood to reflect the perspective of a rider seated on a seat 8 of the motorcycle 1 and facing toward a front wheel 11, unless a different meaning is specified. Thus, "longitudinal" may correspond substantially to a "front-to-back" (or "back-to-front") direction, and "widthwise" may correspond substantially to a direction substantially transverse to the longitudinal or front-to-back direction. "Vertical" may refer to a direction substantially transverse to both the widthwise and front-to-back directions, and correspond substantially to "upward" and/or "downward."

With reference to FIG. 1, the general structure of the motorcycle 1 will be described. The motorcycle 1 can include a cradle-type body frame 2, a water-cooled, 4-stroke cycle and single-cylinder engine 3 provided at the body frame 2, and an intake device 6 and an exhaust device 7 connected to the engine 3. The motorcycle 1 can take in air from the front of the engine 3, and discharge exhaust from the back of the engine 3.

The body frame 2 can be provided with a fuel tank 4 above the engine 3. The body frame 2 can further be provided with a saddle-type seat 8 to the rear of the fuel tank 4. A front part 8a of the seat 8 can at least partly cover the fuel tank 4. For example, the front part 8a can be arranged to cover substantially the entire upper surface of the fuel tank 4, although in alternative embodiments, the front part 8a need not cover the entire upper surface of the fuel tank 4. For example, the seat 8 may not cover a front part of the fuel tank 4, so as to leave a fuel tank opening 4a exposed and accessible. A radiator 5 can be provided in front of the engine 3.

A head pipe 9 can be provided in front of the fuel tank 4 at the front part of the body frame 2, and a front fork 10 can be supported by the head pipe 9 so that the front fork 10 can be operated in the right and left directions. A front wheel 11 can be rotatably supported at the lower end of the front fork 10, and an operation handle 12 can be attached to the upper end. A front fender 13 can be provided above the front wheel 11.

The body frame 2 can include right and left main frames 20 that extend from the head pipe 9 to the back. The body frame 2 further can include a single upper down frame 21 that extends approximately linearly downward from the head pipe 9, and right and left lower down frames 22 that branch from the lower end of the upper down frame 21 and extend approximately horizontally to the back. The lower ends of the right and left main frames 20 can be coupled with the rear ends of the right and left lower down frames 22.

A rear wheel 15 can be rotatably supported at the rear end of a rear arm 14 supported at the body frame 2, so that the rear arm 14 can swing up and down. A rear cushioning member 16 (e.g., a shock absorber) can be provided between the rear arm 14 and the body frame 2. The rear arm 14, the rear cushioning member 16 and associated peripheral members can serve as a rear-wheel suspension. A rear fender 17 that extends over space above the rear wheel 15 can be attached at the body frame 2. The rear fender 17 can extend to the back so that it forms a continuous surface with the seat 8.

Peripheral Structure of Fuel Tank

Figure 2:
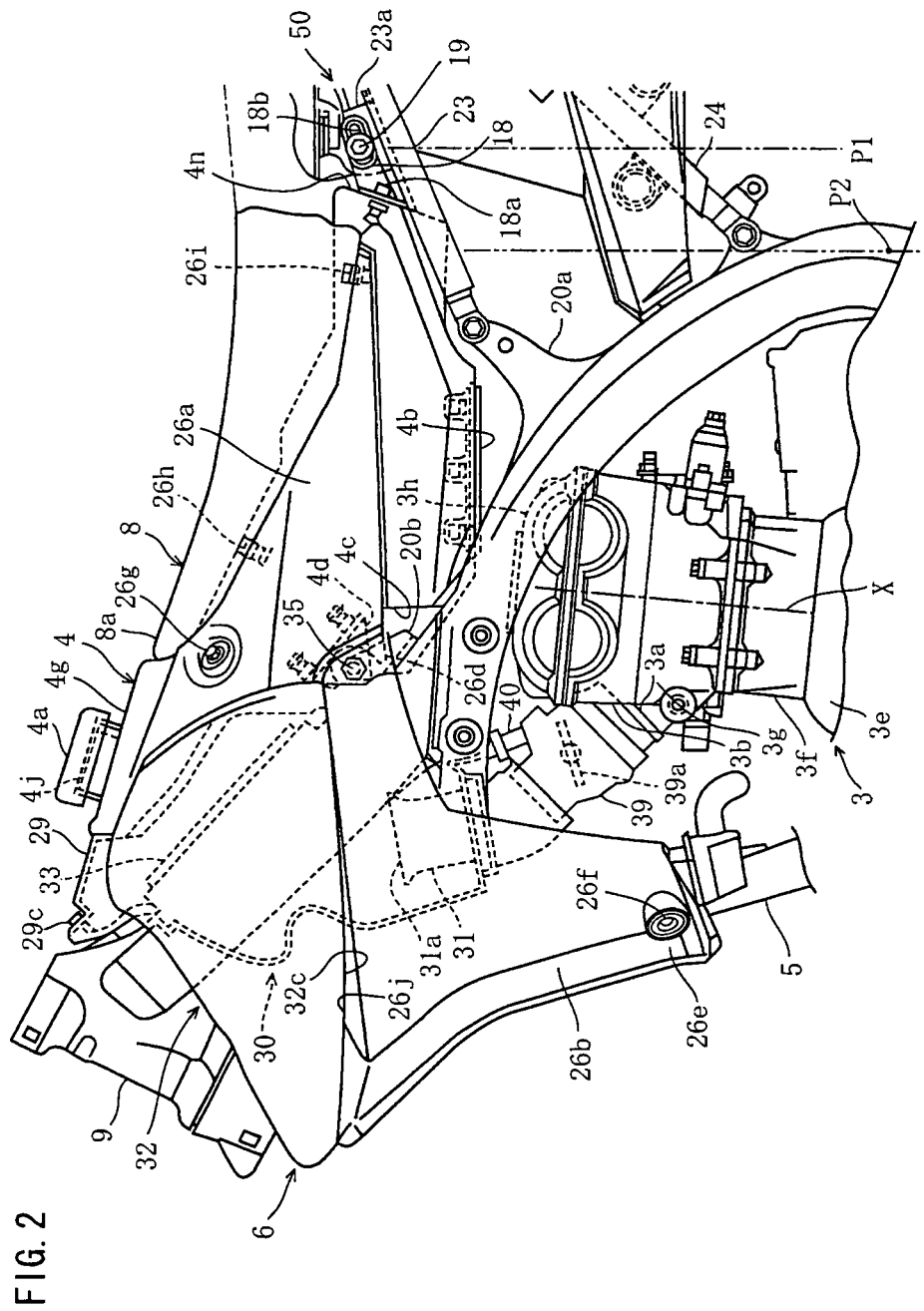
FIG. 2 is a left side view of a peripheral structure of a fuel tank according to the embodiments.

In the following, with reference to FIGS. 2 and 3, a peripheral structure of the fuel tank 4 will be described in detail. FIG. 2 is a left side view that includes the peripheral structure of the fuel tank 4, an air cleaner 30, a side cover 26 and the engine 3.

The body frame 2 can include right and left seat frames 23 and right and left seat stays 24 under the fuel tank 4. The right and left seat frames 23 can be members that extend obliquely upwardly to the back from a rear boss 20a of the right and left main frames 20. The right and left seat frames 23 can support a rear side of the fuel tank 4 and a central part of the seat 8. The right and left seat stays 24 can couple rear ends of the right and left seat frames 23 and parts of the right and left main frames 20 slightly lower than the rear boss 20a in order to reinforce the right and left seat frames 23.

Right and left side covers 26 can be mounted at an outer side of the right and left main frames 20. The right and left side covers 26 can each include a tank cover 26a that at least partly covers a side of the fuel tank 4, and a cleaner cover 26b that at least partly covers a side of the air cleaner 30 and an upper part of the radiator 5. Thus, the cover 26 can be divided into two parts in a longitudinal direction.

Figure 3:
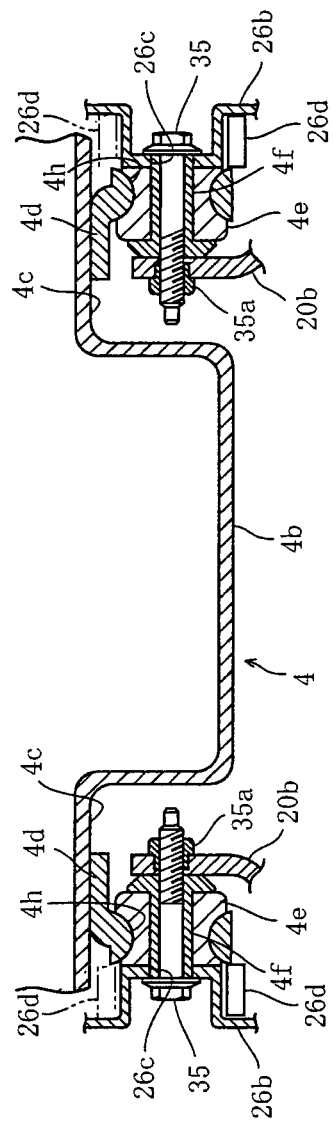
FIG. 3 is a front sectional view of an attachment structure of the fuel tank and a side cover according to the embodiments.

FIG. 3 is a front sectional view showing how the fuel tank 4 and the side cover 26 can be attached. As shown in FIG. 3, right and left attachment recesses 4c can be formed at the right and left sides of a bottom wall 4b of the fuel tank 4, and tank brackets 4d can be fastened or fixed, e.g., by bolts or by welding or the like, to the right and left attachment recesses 4c. A ring-shaped elastic member 4e can be fitted into an attachment hole 4h of the tank bracket 4d. A cylindrical collar 4f can be fitted into the elastic member 4e.

The main frame 20 can be provided with a support bracket 20b to support a front part of the fuel tank 4. The collar 4f of the tank bracket 4d can contact the support bracket 20b. The collar 4f can fitted into an attachment hole 26c of the cleaner cover 26b. The support bracket 20b, the tank bracket 4d, and the cleaner cover 26b can be fastened or fixed together by a bolt 35 and a nut 35a.

Referring back to FIG. 2, a tab 26d can be formed to project forward at a part of the tank cover 26a opposed to the bolt 35. The tab 26d can be held between a rear edge of the cleaner cover 26b and the tank bracket 4d. In this way, the fuel tank 4, the tank cover 26a and the cleaner cover 26b can be fixed to the support bracket 20b of the body frame 2 as they are placed on one another. Moreover, the fuel tank 4, the tank cover 26a and the cleaner cover 26b can be fixed to the body frame 2 so as to at least partly overlap each other. Therefore, the side cover 26 may be divided into front and rear parts, so that the assembling structure of the fuel tank 4 and the side cover 26 can be simplified and the man-hours necessary for assembling can be reduced.

Lower ends 26e of the right and left cleaner covers 26b can be fastened or fixed, e.g. by bolts 26f, at outer walls of the right and left radiators 5, and thus, be separated from each other in a widthwise direction.

The tank cover 26a can be fixed to the fuel tank 4, for example by fastening a front bolt 26g, a central bolt 26h and a rear bolt 26i into nuts embedded in a wall part of the fuel tank 4.

Peripheral Structure of Engine

Figure 4:
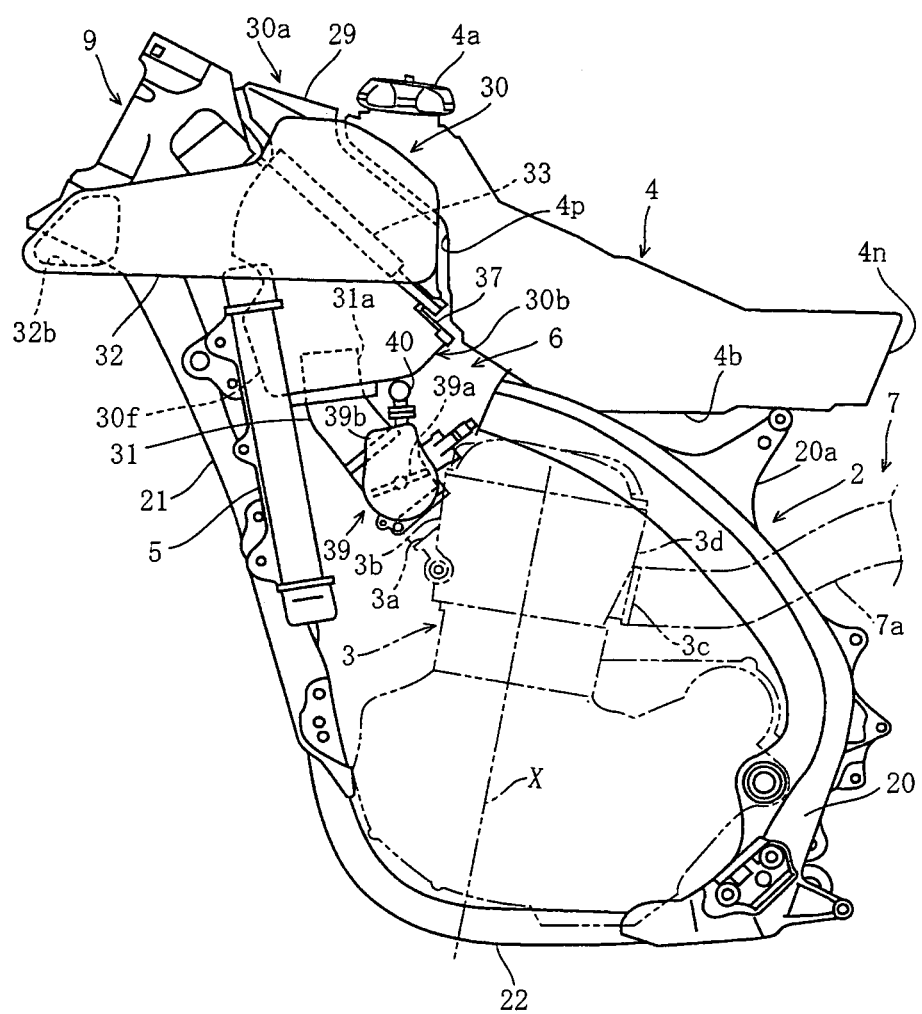
FIG. 4 is a left side view including the fuel tank, an air cleaner, and an engine with the side cover removed, according to the embodiments.

Next, with reference to FIGS. 2 and 4, a peripheral structure of the engine 3 will be described in detail. As shown in FIG. 4, in a space surrounded or at least partly defined by the right and left main frames 20, the upper down frame 21 and the right and left lower down frames 22, the engine 3 can be arranged so that a cylinder axis indicated by axial line X is slightly inclined to the back side of the motorcycle. The engine 3 can thus be slightly inclined to the back side, so that the weight balance of the entire body is improved. As shown in FIG. 2, the engine 3 can include a cylinder body 3f, a cylinder head 3g, and a head cover 3h coupled in a layered structure on a crank case 3e.

As described above, the engine 3 can take in air from the front and discharge exhaust from the back. Referring to FIG. 4, the intake device 6 can provide an intake path that supplies air to an intake opening or port 3a that opens at a front wall 3b of the engine 3. The intake device 6 can be provided above and in front of the engine 3. The exhaust device 7 can discharge exhaust gas from an exhaust opening or port 3c that opens at a rear or back wall 3d of the engine 3. The exhaust device 7 can be provided at the back of or behind the engine 3.

The exhaust device 7 can include an exhaust pipe 7a connected to the exhaust port 3c of the engine 3, and a muffler 7b (see FIG. 1) connected to a downstream end of the exhaust pipe 7a.

Referring again to FIG. 4, the intake device 6 can further include the air cleaner 30, and right and left outside air introduction ducts 32. The right and left outside air introduction ducts 32 can be connected to the air cleaner 30, to extend to the front of the motorcycle and introduce traveling air into the air cleaner 30. The intake device 6 can still further include an intake pipe 31 connected to a bottom of the air cleaner 30. The intake device 6 can still further include a throttle body 39 connected to the intake pipe 31 and including a throttle valve 39a. The throttle body 39 is connected to the intake port 3a.

A fuel injector 40 can be provided at a rear wall of the throttle body 39. The fuel injector 40 can be provided to supply fuel to the intake port 3a, and more specifically, provided toward a back side of an intake valve. A throttle opening degree sensor 39b to detect the opening degree of the throttle valve 39a can be provided on a side of the throttle valve 39a.

The intake pipe 31 and the throttle body 39 can be provided so as to extend in a substantially or approximately vertical direction between the fuel tank 4 and the radiator 5 when viewed from the side of the motorcycle. The intake pipe 31 and the throttle body 39 can be positioned between the right and left radiators 5 and hidden behind the upper down frame 21 when viewed from the front of the motorcycle.

Structure of Air Cleaner

Figure 5:
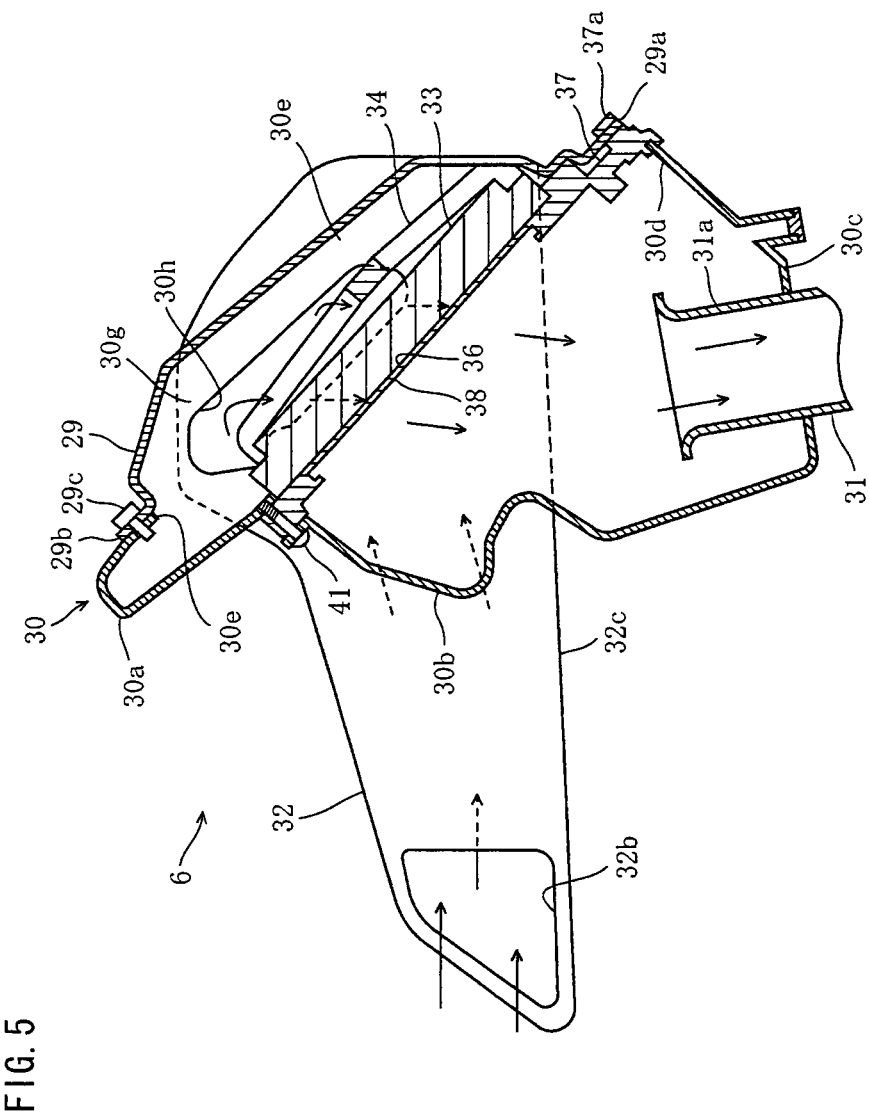
FIG. 5 is a side sectional view of the air cleaner according to the embodiments.
Figure 6:
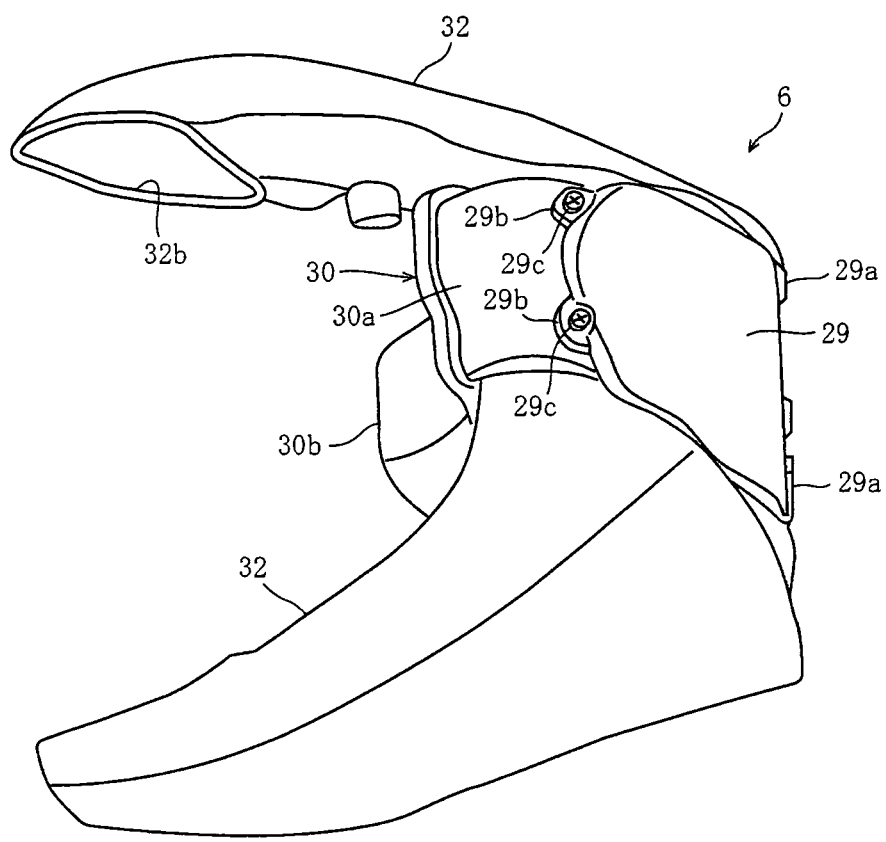
FIG. 6 is a perspective view of the air cleaner viewed obliquely from the upper left.
Figure 7:
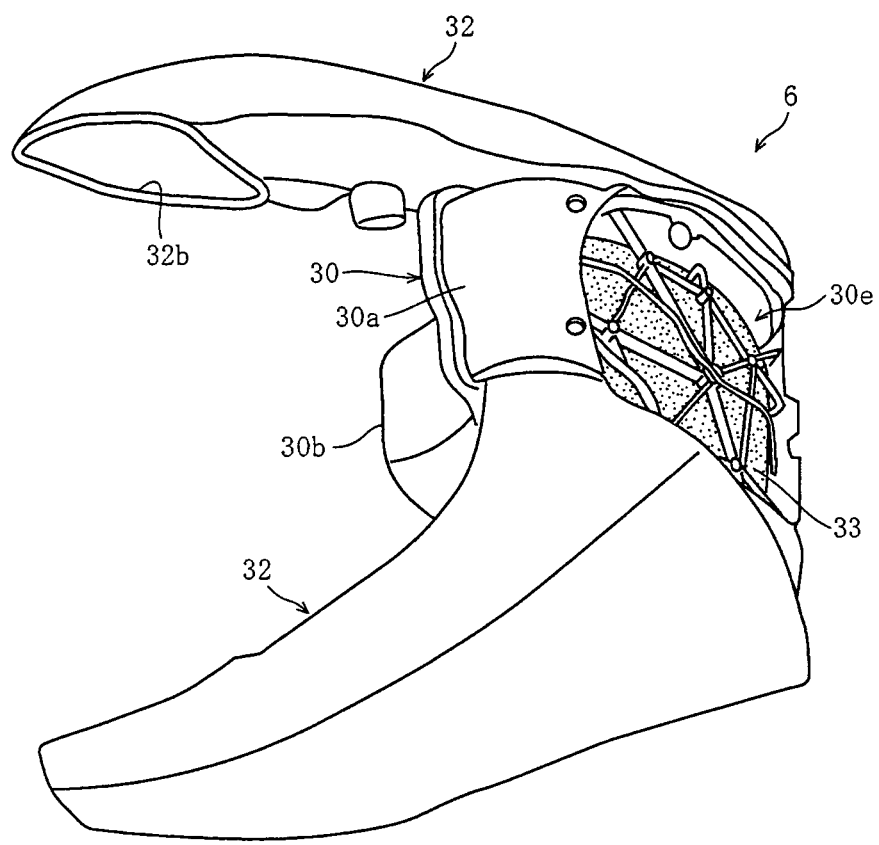
FIG. 7 is a perspective view of the air cleaner with a lid removed.

With reference to FIGS. 4, 5, 6, and 7, the structure of the air cleaner 30 will be described in detail. FIG. 5 is a left side sectional view of the air cleaner 30. FIG. 6 is a perspective view of the air cleaner 30 viewed obliquely from the upper left. FIG. 7 is a perspective view of the air cleaner 30 with a lid thereof removed to expose an element of the air cleaner 30.

As shown in FIG. 4, the air cleaner 30 can be provided above the front part of the engine 3 when viewed from the side of the motorcycle. The air cleaner 30 can be provided in a space surrounded or defined at least in part by the fuel tank 4, the radiators 5, the engine 3, the right and left main frames 20 and the head pipe 9. A rear part of the air cleaner 30 can be at least partly covered with a front part 4g (see FIG. 2) of the fuel tank 4.

With reference to FIG. 5, the air cleaner 30 can include a case main body divided, with respect to a substantially vertical direction, into upper and lower cases 30a and 30b. An element 33 can be provided at a boundary between the upper case 30a and the lower case 30b.

The lower case 30b can be an approximately box-shaped member having an opening into a space bordered by a wall 30d at an obliquely upper portion thereof. The wall 30d of the lower case 30b can be fixed to a bottom of a frame 37 formed along the opening into the space. The upper case 30a can be mounted at an upper surface of the frame 37.

The element 33 can be attached detachably on the frame 37. A sub-element 36 can be provided under the element 33 to cover the opening into the space bordered by the wall 30d. The sub-element 36 can prevent foreign matter such as dust from coming into the lower case 30b during exchanging of the element 33 for a new element, or other maintenance thereof. A metallic net 38 can be mounted opposite the sub-element 36.

The lower case 30b can be positioned between the right and left main frames 20, and extend downward from lower edges of the main frames 20. The intake pipe 31 can be connected to a bottom wall 30c of the lower case 30b. An upstream part 31a of the intake pipe 31 can protrude or project into the lower case 30b.

The upper case 30a can include a maintenance opening 30e. The maintenance opening 30e can be covered with a lid 29. As seen, for example, in FIG. 8, the maintenance opening 30e can be formed at a portion of the upper case 30a at least partly covered by the fuel tank 4. FIG. 7 is a view of the air cleaner 30 with the lid 29 removed. Referring to FIGS. 5 and 6, an attacher, such as a tab 29a formed on a rear edge of the lid 29, can be inserted into a hinge part 37a formed at a rear edge of the frame 37. The lid 29 can be allowed to rotate about the tab 29a. For example, the lid 29 can rotate away from a closed position, e.g., upward, about the tab 29a. A projection 29b formed at a front edge of the lid 29 can be fastened or fixed detachably, e.g. by bolts 29c, at a front edge of the upper case 30a. The lid 29 can be rotated, for example, when detached from the upper case 30a by removing the bolts 29c. With the described arrangement, if the element 33 is to be exchanged for a new element, or otherwise maintained, it is only necessary to rotate the fuel tank 4 away from a closed or resting position, e.g., upward, and then rotate the lid 29 away from its closed position, e.g., upward.

Referring to FIG. 4, the upper case 30a can be positioned between the fuel tank 4 and the head pipe 9 when viewed from the side of the motorcycle, and can extend in the widthwise direction of the motorcycle so that it at least partly covers the right and left main frames 20 from above. A major part of the upper case 30a can be arranged so as to be received within a storage recess 4p formed at a front bottom wall of the fuel tank 4. When the fuel tank 4 is rotated upward, the lid 29 can be exposed.

As shown in FIG. 5, elongate air inlets 30h can be formed at right and left side walls 30g of the upper case 30a. The right and left outside air introduction ducts 32 can be connected to the right and left side walls 30g of the upper case 30a to communicate with the air inlets 30h, and extend to the front of the motorcycle from the upper case 30a. Outside air introduction holes 32b can be formed at front ends of the outside air introduction ducts 32 so that the holes 32b open inwardly in a substantially widthwise direction.

As shown in FIG. 2, upper edges 26j of the cleaner covers 26b can contact lower edges 32c of the right and left outside air introduction ducts 32, so that the outside air introduction ducts 32 and the cleaner covers 26b form continuous surfaces. In this way, the right and left outside air introduction ducts 32 can also serve as a body cover.

Rotation Structure of Fuel Tank

Figure 8:
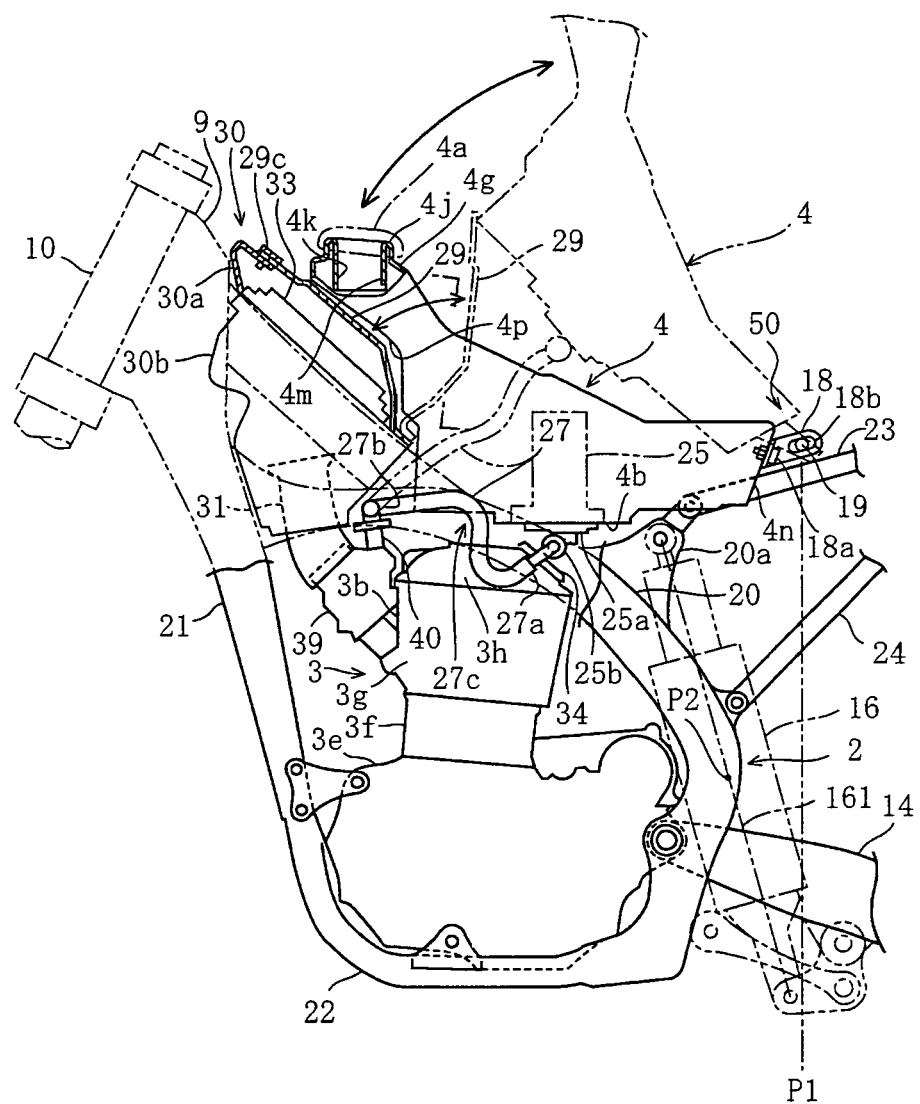
FIG. 8 is a left side view showing a state of rotation of the fuel tank, and the peripheral structure of the fuel tank.

Next, with reference to FIGS. 2 and 8, a rotation structure of the fuel tank 4 will be described. FIG. 8 is a left side view of a state of rotation of the fuel tank 4 and the peripheral structure of the fuel tank 4. More specifically, FIG. 8 shows the fuel tank 4 (in broken-line outline) rotated away (e.g., upward) from a resting or closed position as shown in, for example, FIGS. 1, 2 and 4 (solid outline in FIG. 8). A supporter 50 that rotatably supports the fuel tank 4 in a substantially vertical direction can be provided at a rear wall 4n of the fuel tank 4. The supporter 50 can include left and right tank side support brackets 18 and left and right support brackets 23a (see FIG. 2) formed at the right and left seat frames 23 on sides of the body frame 2. The supporter can further include a coupling pin 19 that couples the left and right tank side support brackets 18 to the left and right support brackets 23a. The coupling pin 19 can serve as a rotation axis of the tank 4.

More specifically, the tank side support brackets 18 can be fastened or fixed to the rear wall 4n, e.g. by a bolt 18a. An elongate hole 18b elongated in a substantially or approximately longitudinal direction can be formed in the support brackets 18. The coupling pin 19 can be inserted into the elongate hole 18b of the support brackets 18 and fixed to the support brackets 23a. The fuel tank 4 can be supported rotatably in a substantially vertical direction by the support brackets 23a through the coupling pin 19. Put another way, the fuel tank 4 can rotate about an axis formed by the coupling pin 19 supported by the support brackets 23a and coupling the support brackets 23a to the tank side support brackets 18.

Moreover, the supporter 50 can operate with an adjuster to adjust a position of the fuel tank 4 in a substantially or approximately longitudinal direction. In more detail, the position of the elongate hole 18b relative to the coupling pin 19 can be adjusted, e.g. by moving or sliding the tank side support brackets 18 relative to the coupling pin 19 in a substantially or approximately longitudinal direction.

As shown in FIG. 8, a fuel pump 25 can be provided in the fuel tank 4. A bottom 25a of the fuel pump 25 can project downwardly from an opening formed at a bottom wall 4b of the fuel tank 4. The projecting part, bottom 25a, can be connected with a discharge opening or pipe 25b. The discharge pipe 25b can extend outwardly for a portion thereof in a substantially widthwise direction (e.g., to the left), and then bend forward obliquely and downwardly to form a bent part. The bent part can be connected with one end 27a of a fuel hose 27. The other end 27b of the fuel hose 27 can be connected with the fuel injector 40 mounted at the throttle body 39. A thermal insulation cover 34 can be provided between the portion of the discharge pipe 25b that extends outwardly in the widthwise direction and a head cover 3h of the engine 3.

The fuel hose 27 can include a slack portion 27c (e.g., a curved slack portion) that allows the fuel tank 4 to rotate away from the resting position, e.g., upward, without having to disconnect the fuel hose 27. A pump side part of the slack portion 27c can be positioned between the main frame 20 and the head cover 3h of the engine 3. Another part of the slack portion 27c can extend above the head cover 3h toward the fuel injector 40 when viewed from the side of the motorcycle. When the fuel tank 4 is rotated downwardly from an upwardly rotated position to the resting or closed position, the slack portion 27c can be positioned so that the slack portion 27c at least partly overlaps the head cover 3h when viewed from the side of the motorcycle.

A resin member can be used, for example, for the fuel tank 4. In this case, the rear wall 4n of the fuel tank 4 may move, e.g., bulge or swell, backward slightly, because the fuel tank 4 may expand or swell due to being filled with gasoline. The movement of the rear wall 4n caused by the swelling of the fuel tank 4 can be absorbed or accommodated by the elongate hole 18b of the support bracket 18, which can allow for backward movement relative to the coupling pin 19.

When maintenance is to be performed on the element 33 in the air cleaner 30, the fuel tank 4 can be rotated away from the resting or closed position as shown for example in FIG. 2, to expose the lid 29 of the air cleaner 30, as shown in FIG. 8. More specifically, referring to FIG. 2, the bolt 35 fixing the front part of the bottom wall 4b of the fuel tank 4 can be removed, and then the fuel tank 4 can be moved to the front (or the back) by an amount permitted by the elongate hole 18b and then rotated away from the resting position, e.g., upward. Then, referring to FIGS. 6 and 7, the bolts 29c at the front edge of the lid 29 can be removed and the lid 29 can be rotated away from its closed position, e.g., upward, about the rear edge of the lid 29. In this way, the element 33 can be exposed as shown in FIG. 7.

According to the foregoing description, the air cleaner 30 can be provided in front of the engine 3. In other words, the air cleaner 30 can be provided away from the coupling pin 19 around which the fuel tank 4 is rotated, so that a large space can be secured above the air cleaner 30 without significantly increasing the angle of rotation of the fuel tank 4. This feature can facilitate maintenance of the air cleaner 30.

As shown in FIG. 8, the longitudinal position of the supporter 50 around which the fuel tank 4 is rotated is approximately in the same position as, or is substantially or approximately aligned with, a longitudinal position P1 of a bottom portion or rear end (lower end) of the rear cushioning member 16. More specifically, the center of rotation the fuel tank 4 is positioned farther to the rear or back side of the motorcycle 1 than in a conventional structure. In this way, the lid 29 of the air cleaner 30 may be readily removed and the element 33 may be easily maintained without greatly rotating the fuel tank 4 upward.

In addition, still referring to FIG. 8, the position of the center of rotation of the fuel tank 4 is higher than the position of the bracket 20a provided at the main frame 20. More specifically, the center of rotation is provided on the seat frame 23 fixed at the bracket 20a and extending upwardly obliquely to the back, so that the position of the center of rotation is in a higher position than the position of the bracket 20a. In this way, the lid 29 of the air cleaner 30 can readily be removed, and the element 33 can readily be exchanged for a new element or otherwise maintained without increasing the angle to rotate the fuel tank 4 upward.

As discussed, according to the foregoing description, the position of the center of rotation of the fuel tank 4 is approximately in the same position, with respect to the longitudinal direction, as the position P1 at the rear end of the rear cushioning member 16. However, the center of rotation may be positioned even farther to the rear side than the rear end of the rear cushioning member 16. In this way, the air cleaner 30 can be readily maintained by rotating the fuel tank 4.

Still referring to FIG. 8, when it is difficult to position the center of rotation of the fuel tank 4 near the rear end of the rear cushioning member 16, the air cleaner 30 can still be readily maintained if the center of rotation is approximately in the same position, with respect to the longitudinal direction, as a substantially central portion or position P2 of the axis 161 of the rear cushioning member 16, or in a position to the rear of the central position P2.

If positioned as described above, the center of rotation of the fuel tank 4 can be positioned farther to the rear or upper side of associated neighboring structures than in conventional arrangements, and therefore the air cleaner 30 as well as the engine 3 can be readily maintained. This is at least in part because the fuel tank 4 need not be rotated to such a substantial degree to perform maintenance as in conventional arrangements. More specifically, as shown in FIG. 8, as the fuel tank 4 is rotated away from its resting position, e.g., upward, a large space is secured above the engine 3 and therefore the head cover 3h can be removed and the valves, the plugs or the like can be readily maintained without removing the fuel hose 27.

Furthermore, since the fuel injector 40 is provided toward the front wall 3b, the fuel injector 40 can be viewed from above when the fuel tank 4 is rotated away from its resting position (e.g., rotated upward), and the periphery of the fuel injector 40 can be readily maintained.

When the fuel tank 4 is rotated upward, the slack portion 27c of the fuel hose 27 can be transposed from the state indicated by the solid line in FIG. 8 to the state indicated by the double-dotted chain line, allowing the fuel tank 4 to be rotated without disconnecting the fuel hose 27. In this regard, it should be understood that the slack portion 27c must be longer as the rotation angle increases. According to the foregoing description, the fuel tank 4 can be moved forward along the elongate hole 18a as described above, and then rotated upward, so that the necessary length of the slack portion 27c can be reduced.

Alternatively, the fuel tank 4 may be moved backward along the elongate hole 18a to place the center of rotation of the fuel tank 4 in a higher position, so that a large space for maintenance can be secured.

Still referring to FIG. 8, according to the foregoing description, the slack portion 27c of the fuel hose 27 can be positioned between the head cover 3h and the left main frame 20, and therefore a space for positioning the slack portion 27c of the fuel hose 27 can readily be secured. Additionally, because less slack in the fuel hose 27 is needed as compared with conventional arrangements, the space for positioning the slack portion 27c when the fuel tank 4 is in an original position (e.g., a closed or resting position not rotated for maintenance) can be more easily secured.

For the slack portion 27c to be positioned between the head cover 3h and the main frame 20, the discharge pipe 25b should extend substantially in the widthwise direction at the upper surface of the head cover 3h. This arrangement could in some cases raise the temperature of the fuel in the slack portion 27c and/or discharge pipe 25b. However, the thermal insulation cover 34 provided between the widthwise-extended part of the discharge pipe 25 and the cylinder head 3h can effectively restrain or inhibit an increase in the temperature of the fuel.

Referring now to FIG. 2, as described previously, for the cylinder block 3f and the cylinder head 3g of the engine 3, the cylinder axial line X can be slightly inclined to the back, so that the front wall 3b of the cylinder head 3g is inclined obliquely to the back. Therefore, a space for positioning the fuel injector 40 can be easily secured, and the fuel injector 40 can be easily maintained.

Referring now to FIG. 5, the element 33 of the air cleaner 30 can be provided above the intake pipe 31, so that intake air passed through the element 33 comes directly into the opening of the intake pipe 31. Therefore, the intake air resistance can be reduced, and the airflow can be smoothed, which can contribute to improved filling efficiency and thus improved engine output.

As shown in FIG. 8, a fuel supply opening 4j can be formed at the front part 4g of the fuel tank 4. A fuel cap 4a can be detachably mounted at the fuel supply opening 4j.

Figure 9:
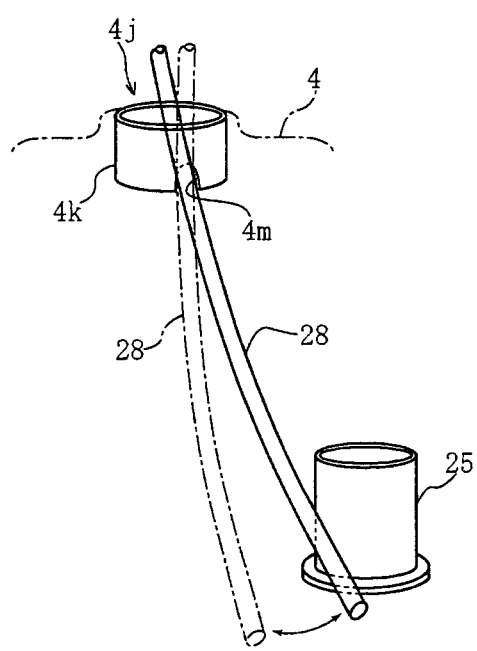
FIG. 9 is a perspective view of a tubular member at a fuel supply opening used to guide a suction pump into the fuel tank, according to the embodiments.

The fuel supply opening 4j can be provided with a tubular body 4k that extends downwardly and projects into the fuel tank 4. A notch 4m can be formed at the lower edge of the tubular body 4k as shown in FIG. 9. When, for example, a suction hose 28 is inserted into the fuel tank 4 in order to suck in fuel in the fuel tank 4, the notch 4m can guide the suction hose 28 in such a direction that the hose does not contact the fuel pump 25. In this way, damage to the fuel pump 25, especially to its wires during a suction operation, can be prevented.

Referring to FIG. 2, the fuel supply opening 4j can be formed at a part of the fuel tank 4 that at least partly covers the air cleaner 30, e.g., at the part 4g positioned farther to the front side of the fuel tank 4 than the seat 8, so that the fuel supply opening 4j and the fuel cap 4a are exposed and easily accessible. With this arrangement, refueling can readily be carried out without having to lift or detach the seat.

As described previously and as shown in FIG. 5, for example, the lid 29 can be rotatably supported at the tab 29a provided at the rear edge of the opening 30e. Accordingly, the lid 29 can rotate away from a closed position, e.g., upward, about the rear edge of the opening 30e. Thus, the lid 29 can rotate in approximately or substantially the same direction as the rotation direction of the fuel tank 4, so that the element 33 can be maintained without significantly increasing the rotation angles of either the lid 29 or the fuel tank 4. By contrast, if the lid 29 were to be rotated about the front edge of the opening 30e, the element 33 would be hidden until both the lid 29 and fuel tank 4 were rotated by at least 90°.

As shown in FIG. 2, the bolt 29c used to fix the lid 29 can be provided more to the front side of the motorcycle 1 than the part of the seat 8 that at least partly covers the fuel tank 4, so that the bolt 29c is exposed from above. Thus, the state of the bolt 29c (e.g., whether fixed or not) can be easily observed visually to, for example, check whether or not the lid 29 is securely fixed.

According to the foregoing description, the engine 3 and the air cleaner 30 can be connected through the intake pipe 31. However, in alternative embodiments the air cleaner 30 may be provided near the engine 3 and the case of the air cleaner 30 may be in close contact with the intake side of the engine 3.

It will be apparent to one skilled in the art that the manner of making and using the claimed invention has been adequately disclosed in the above-written description of the preferred embodiments taken together with the drawings.

It will be understood that the above description of the preferred embodiments of the present invention are susceptible to various modifications, changes and adaptations, and the same are intended to be comprehended within the meaning and range of equivalents of the appended claims.

What is claimed is:

1. A motorcycle, comprising:
    a body frame;
    a rear arm attached to the body frame to support a rear wheel;
    a rear cushioning member provided between the body frame and the rear arm;
    an engine fixed to the body frame closer to a front side of the motorcycle than the rear cushioning member, the engine being supplied with air via an intake path in front of the engine;
    a fuel tank supported rotatably at a supporter arranged closer to a rear side of the motorcycle than a substantially central position of an axis of the rear cushioning member, the fuel tank being provided above the engine;
    an air cleaner connected to the engine through the intake path and at least partly covered by the fuel tank;
    a fuel pump provided in the fuel tank;
    a throttle body connected to an intake pipe;
    a fuel hose communicating between a discharge opening of the fuel pump and the throttle body, the fuel hose including a slack portion provided between a head of the engine and the body frame so as to at least partly overlap the head of the engine when viewed from a side of the motorcycle while the fuel tank is in a resting position, the slack portion allowing the fuel tank to rotate away from the resting position without disconnecting the fuel hose;

a discharge pipe connected with the fuel pump and extending in a substantially widthwise direction; and a thermal insulation cover provided between a portion of the discharge pipe and the head of the engine.

2. The motorcycle according to claim 1, wherein
the air cleaner includes a case main body, and the case main body includes:
   an opening formed at a portion at least partly covered by the fuel tank; and
   a lid covering the opening;
the air cleaner further including an element stored in the case main body and capable of being exposed through the opening when the lid is removed.

3. The motorcycle according to claim 2, wherein the case main body includes an attacher arranged at a rear edge of the opening to rotatably support the lid.

4. The motorcycle according to claim 1, wherein
the engine includes an intake opening provided at a front wall of the engine, and an exhaust opening provided at a rear wall of the engine,
the motorcycle further comprising:
   the intake pipe communicating between the intake opening and a bottom of the air cleaner; and
   a fuel injector connected to the intake pipe, and visible from above with the fuel tank rotated away from a resting position.

5. The motorcycle according to claim 1, wherein
the engine has a cylinder axis inclined toward a back of the motorcycle.

6. The motorcycle according to claim 1, further comprising:
   a seat having a front portion at least partly covering the fuel tank;
   the fuel tank including a fuel supply opening closer to a front side of the fuel tank than the seat.

7. The motorcycle according to claim 1, wherein
the supporter operates with an adjuster to adjust a position of the fuel tank in a longitudinal direction.

8. The motorcycle according to claim 1, further comprising:
   a side cover at least partly covering the fuel tank and the air cleaner, wherein:
   the side cover includes
      a tank cover at least partly covering the fuel tank, and
      a cleaner cover at least partly covering the air cleaner;
   and the fuel tank, the tank cover and the cleaner cover are fixed to the body frame so as to at least partly overlap each other.

9. The motorcycle according to claim 1, wherein the motorcycle is for off-road racing.

10. A vehicle with a rotatable fuel tank, comprising:
    a rotation structure for rotation of the fuel tank;
    a cushioning member of a rear wheel suspension of the vehicle;
    an air cleaner including a case main body;
    a fuel pump provided in the fuel tank;
    a throttle body connected to an intake pipe; and
    a fuel hose communicating between a discharge opening of the fuel pump and the throttle body, the fuel hose including a slack portion provided between a head of an engine and a body frame so as to at least partly overlap the head of the engine when viewed from a side of the vehicle while the fuel tank is in a resting position, the slack portion allowing the fuel tank to rotate away from the resting position without disconnecting the fuel hose;
    wherein the rotation structure is located farther toward a rear of the vehicle than a substantially central portion of the cushioning member; and
    wherein the case main body includes an opening formed at a portion at least partly covered by the fuel tank and a lid covering the opening;
    the air cleaner further including an element stored in the case main body and capable of being exposed through the opening when the lid is removed;
    a discharge pipe being connected with the fuel pump and extending in a substantially widthwise direction; and
    a thermal insulation cover being provided between a portion of the discharge pipe and the head of the engine.

11. The vehicle of claim 10, wherein the rotation structure comprises:
    tank support brackets having an elongated opening formed therein; and
    a rotation axis provided between the tank support brackets.

12. The vehicle of claim 11, wherein a position of the rotation axis is adjustable with respect to the elongated opening.

13. The vehicle of claim 11, wherein the rotation axis includes a coupling pin coupling the tank support brackets to seat support brackets of the vehicle.

14. The vehicle of claim 10, wherein the vehicle is a motorcycle.

15. The vehicle of claim 10, further comprising an air cleaner having a maintenance opening with a rotatable lid.

16. The vehicle of claim 15, wherein the lid is rotatable about a rear edge of the maintenance opening.

17. The vehicle of claim 15, wherein the lid is rotatable about a member coupled to a hinge part formed at a rear of the maintenance opening.

18. The vehicle of claim 15, further comprising:
    a fuel tank;
    a radiator;
    an engine;
    a main frame; and
    a head pipe;
    wherein the air cleaner is provided in a space defined at least in part by the fuel tank, the radiator, the engine, the main frame and the head pipe.

* * * * *